T. A. GALT & GEORGE S. TRACY.
Improvement in Corn-stalk Cutters.

No. 121,353.   Patented Nov. 28, 1871.

Witnesses.   Inventors.

*Reissued Jany. 14th 1873.*

121,353

UNITED STATES PATENT OFFICE.

THOMAS A. GALT AND GEORGE S. TRACY, OF STERLING, ILLINOIS.

IMPROVEMENT IN CORNSTALK-CUTTERS.

Specification forming part of Letters Patent No. 121,353, dated November 28, 1871.

*To all whom it may concern:*

Be it known that we, THOMAS A. GALT and GEORGE S. TRACY, of Sterling, in the county of Whiteside and State of Illinois, have invented a new and valuable Improvement in Cornstalk-Cutters; and we do hereby declare that the following is a full, clear, and exact description of the construction and operation of the same, reference being had to the annexed drawing making a part of this specification, and to the letters and figures of reference marked thereon.

Figure 1:
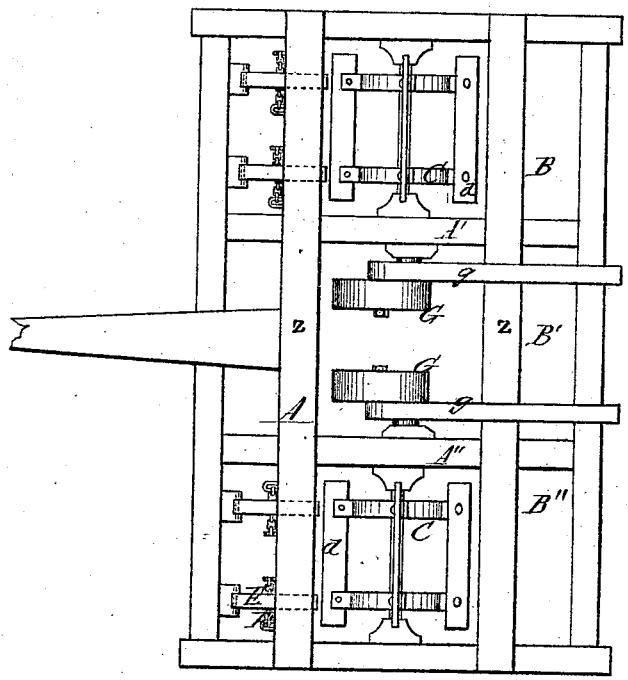
Figure 2:
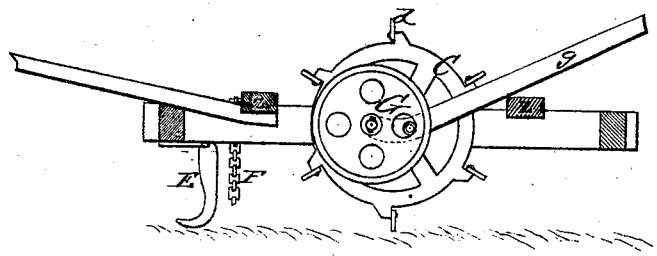

Figure 1 of the drawing is a plan view of our invention. Fig. 2 is a longitudinal vertical section of the same.

This invention has relation to an implement for cutting cornstalks lying on the ground; and the novelty consists in the construction and novel arrangement of wheels and levers for raising the implement so that it may be more readily moved from and to the field, or from place to place when not in operation.

Referring to the drawing, A represents a rectangular frame divided by beams A' A'' into three sections, B B' B''. Each of sections B B'' is provided with a reel or rotary cutter, C, furnished with chopping-knives d, and journaled to the sides of the section in which it is arranged. These cutters chop the stalks of corn in passing over them. E represents hooks hinged to the forward transverse-beam of the frame A, and designed for the purpose of straightening the stalks in front of the cutters. F designates chains, to hold the hooks E when they are raised from the ground. G indicates caster-wheels journaled to the ends of curved levers $g$, which are pivoted at a different point to the sides of the section B'.

By turning the levers forward the caster-wheels are turned down below the cutters, the frame A being raised so as to elevate them above the ground. In this position the implement is supported on the casters, and may be readily moved from place to place. A reverse movement of the lever elevates the casters and lets the implement down in a position for operation.

The relative arrangement of the wheels G, levers $g$, and transverse stop-bars $z$ $z$ is such as to make them self-locking in either of the positions described.

This implement is designed to operate as a double-row cutter.

We claim as our invention—

In a corn-stalk-cutter having the cutting-reels C and the transverse beams or stop-bars $z$, the bent levers $g$ pivoted about midway between the stop-bars $z$, and bearing at the ends of their lower or curved arms the carrying-wheels G, substantially as specified.

In testimony that we claim the above we have hereunto subscribed our names in the presence of two witnesses.

THOMAS A. GALT.
GEO. S. TRACY.

Witnesses:
JAS. B. PATTERSON,
I. J. COOK.

(73)